United States Patent [19]

Yellowley et al.

[11] Patent Number: 5,394,323

[45] Date of Patent: Feb. 28, 1995

[54] PATH ERROR CONTROL SYSTEM

[75] Inventors: Ian Yellowley, West Vancouver; Rudolf J. Seethaler, Vancouver, both of Canada

[73] Assignee: The University of British Columbia, Vancouver, Canada

[21] Appl. No.: 219,566

[22] Filed: Mar. 29, 1994

[51] Int. Cl.⁶ ..................... G05B 19/25; G05B 19/18; G06F 15/46
[52] U.S. Cl. .......................... 364/167.01; 364/474.31; 318/573
[58] Field of Search ......... 364/167.01, 474.28–474.31, 364/768, 723; 318/573, 608, 600, 568, 648, 632, 621, 626

[56] References Cited

U.S. PATENT DOCUMENTS

| | | | |
|---|---|---|---|
| 3,591,781 | 7/1971 | Brenza | 318/573 |
| 3,621,216 | 11/1971 | Wortzman | 318/573 |
| 3,727,191 | 4/1973 | McGee | 364/474.3 |
| 4,362,978 | 12/1982 | Pollard et al. | 318/568 |
| 4,449,196 | 5/1984 | Pritchard | 364/768 |
| 5,187,417 | 2/1993 | Minnich et al. | 318/600 |
| 5,222,017 | 6/1993 | Yellowley | |

OTHER PUBLICATIONS

"Zero Phase Error Tracking Algorithms for Digital Control" Tomizuka M. 1987 ASME 109 Mar. p. 65–68.
"A Note on a Single Method for the Improvement of Interpolation Accuracy in General Purpose Multi-Processor Band Monitor Controller" Yellowley et al. International Journal of Machine Tools & Manufacture, vol. 29 No. 2 1989 pp. 287–292.
"Design of Control System" A Fresh D'Souza, Prentice Hall, pp. 230–238 1988.

*Primary Examiner*—James P. Trammell
*Attorney, Agent, or Firm*—C. A. Rowley

[57] ABSTRACT

The desired path for each axis is predefined and converted to a first series of coarse position increments at time intervals. The coarse position increments are converted to a second series of spaced, (in time), fine position increments and expected values of velocity v. The latter parameters requiring splining and interpolation of values. The actual position of each axis is measured and compared with that required (by the fine series of position increments) to determine the resulting error E which is then compared with a calculated allowable error, $e_{allowable}$ calculated as a function of the then current planned velocity value v i.e. the planned value of velocity v corresponding to the current fine position increment and a signal is triggered when the actual error E exceeds the allowable error $e_{allowable}$ to prevent processing of the next increment in the second series of increments.

12 Claims, 4 Drawing Sheets

PATH ERROR CONTROL SYSTEM

FIELD OF THE INVENTION

The present invention relates to the control of axes of motion, more particularly, the present invention relates to a velocity dependent path error control system.

BACKGROUND OF THE PRESENT INVENTION

It is normal in the control of multi-axis equipment to perform an interpolation process where the distance travelled by each axis over the next time period is calculated by a master processor (interpolator) and transmitted to the corresponding axis controller. These processors do not guarantee that the motion generator will follow the prescribed path and errors are generated. Obviously, it would be preferred to have each axis follow exactly the prescribed path or failing this, to have each axis lag behind the command by a constant time increment. The latter may be achieved by specifying an allowable error distance which is proportional to the commanded velocity. This has been achieved in prior systems by a number of different means. The most common are the following:

1. Complex digital algorithms which attempt to cancel the fundamental dynamics of each axis. These algorithms operate on the incoming commands from the interpolator and manipulate the input so that the final motion is close to that required. A survey of such methods is provided in Tomizuka, M., 1987, "Zero Phase Error Tracking Algorithms for Digital Control", ASME Transaction, Journal of Dynamic Systems, Measurement and Control, Vol. 109, March, pp 65–68. This approach has many advantages but is computationally intensive and has a major disadvantage in that changes in the characteristics of the drive will lead to large errors. Such changes in the dynamics are particularly evident in the presence of non-linearities or limits such as amplifier saturation.

2. Another approach which avoids the problem of exceeding the capacity of the system is to process the position file, generally using higher order splines, to ensure that the acceleration and jerk are within acceptable limits. This procedure is even more time consuming and relies on extremely good process and dynamic models, thus, cannot accommodate unexpected disturbance
inputs such as changes in cutting forces or changes in axis characteristics as a result of work piece mass, etc.

U.S. Pat. No.5,222,017 issued Jun. 22, 1993 to Yellowley et al. describes a particular control system utilizing a state line, the condition of which is used to trigger upgrading of the action of the control axis slaves to the next increment of the spline only when the state line indicates that all parameters influencing the state line have been satisfied. If all parameters are not satisfied, the status of the state line indicates that an advance is not acceptable to at least one of the monitored parameters and the last increment of movement is repeated by all of the axes until the condition triggering the status of the state line has been overcome, i.e. the state line indicates an acceptable status and only then do the slaves all advance to perform the next increment of their respective actions.

Generally, with the Yellowley et al. system, triggering of the state line from an accept status to a hold status is dependent on the amount of measured error compared with a predetermined or preset acceptable error limit which, when exceeded, triggers or flags the state line to a hold status to prevent upgrading of the slave axis to the next spline increment.

A modification of the system described in U.S. Pat. No. 5,222,017 is described in application 08/100,810 filed Aug. 2 1993 Yellowley et al. This system is a more sophisticated system, wherein the degree of error will trigger the status of different state lines to define the size of the increment of advance of the operation that may be used.

BRIEF DESCRIPTION OF THE PRESENT INVENTION

It is an object of the present invention to provide an improved control system to reduce path error in a multi-processor control.

Broadly, the present invention relates to an axis interpolation and control system comprising, dividing a desired path of an axis into a series of time spaced position increments, defining a series of planned values v of velocity for said axis over time by interpolation of said position increments, determining the actual position of said axis along said path, comparing said determined actual position with a then current position increment of said desired path to define an actual position error E, determining an allowable error $e_{allowable}$ as a function of a then current planned velocity value v, comparing said position error E with said allowable error $e_{allowable}$ and triggering a status signal to prevent upgrading said control system to the next time spaced position increment in said series when said position error E is larger than said allowable error $e_{allowable}$.

Preferably, said allowable $e_{allowable}$ will be determined based on the following equation $$|e_{allowable}| = |vT_{p1}| + |\delta_{stat}| \qquad (1)$$

where
$T_{p1}$ is the steady state phase lag
v is velocity
$\delta_{stat}$ is allowable static error.

Preferably said velocity spline defined by the linear relationship $$v(t) = \frac{1}{2\Delta t}\left[(X_{i+1} - X_{i-1}) + (X_{i+2} - X_{i+1} - X_i + X_{i-1})\frac{t}{\Delta t}\right] \qquad (2)$$

where
$X_i$ = instantaneous position increment of said first series
t = time value
$\Delta t$ = an increment of time More preferably for non zero velocity said allowable error $e_{allowable}$ will be defined by $$\text{sign}(v)e_{allowable} < \text{sign}(v)T_{p1}v + \delta_{static} \qquad (3)$$

where
$e_{allowable}$ = allowable error
v = current velocity v
$T_{p1}$ = steady state phase lag
$vT_{p1}$ = calculated allowable error based on v and $T_{p1}$ Preferably said dividing said desired path into a series of time spaced increments will comprise dividing said path into a first coarse time spaced series of position increments and defining a second series of fine time spaced position increments by interpolation of said coarse position increments and wherein said series of planned values v of velocity are defined by interpolation of said first series of increments and wherein said actual position error E is determined by comparing said determined actual position with a then current increment of said second series of fine time spaced increments and said status signal prevents upgrading said control system to the next said time spaced position increment in said second series when said position error E is larger than said allowable error $e_{allowable}$.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
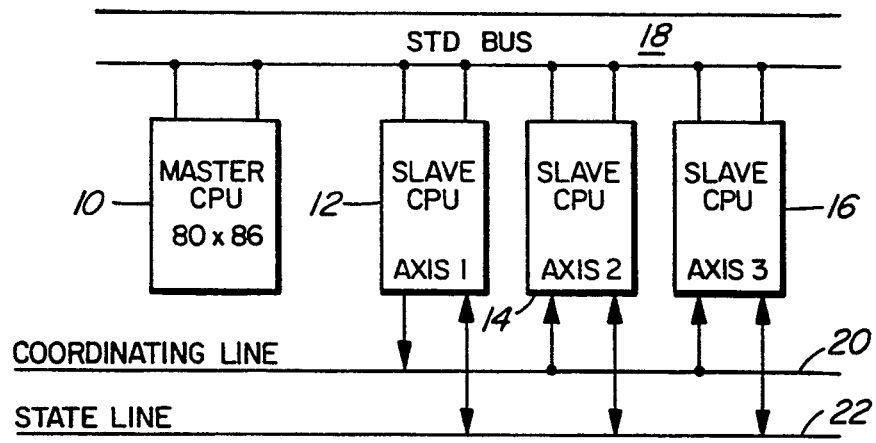
FIG. 1 is a schematic illustration of a control system in which the present invention may be used.

A preferred system into which the axis controller of the present invention may be incorporated is illustrated in FIG. 1 and includes a master controller 10 that controls a plurality of slaves which in the illustration are axis slaves 12, 14 and 16 by delivering signals along the bus 18. A coordinating line 20 delivers coordinating signals provided by one of the computers (CPUs) in the system to the other CPUs. In the particular illustration, the axis slave 12 coordinates the action of each of the other slaves 14 and 16 in the system.

A state line 22 delivers the status signal (accepting or rejecting-preventing up-grading to the next increment) from each of the slaves (which may also included monitoring slaves monitoring other conditions) to the other slaves in the system signalling advance or up-grading the operation of each of the axis slaves 12, 14 and 16 to carry out the next incremental movement if all of the slaves indicate that the next incremental movement is acceptable, or if not acceptable to any one of the slaves, signalling to repeat the previous step.

This system is more fully described in said U.S. Pat. No. 5,222,017 the description of which is included herein by reference. The description of the said U.S. application Ser. No. 08/100,810 is also incorporated herein by reference.

Figure 2:
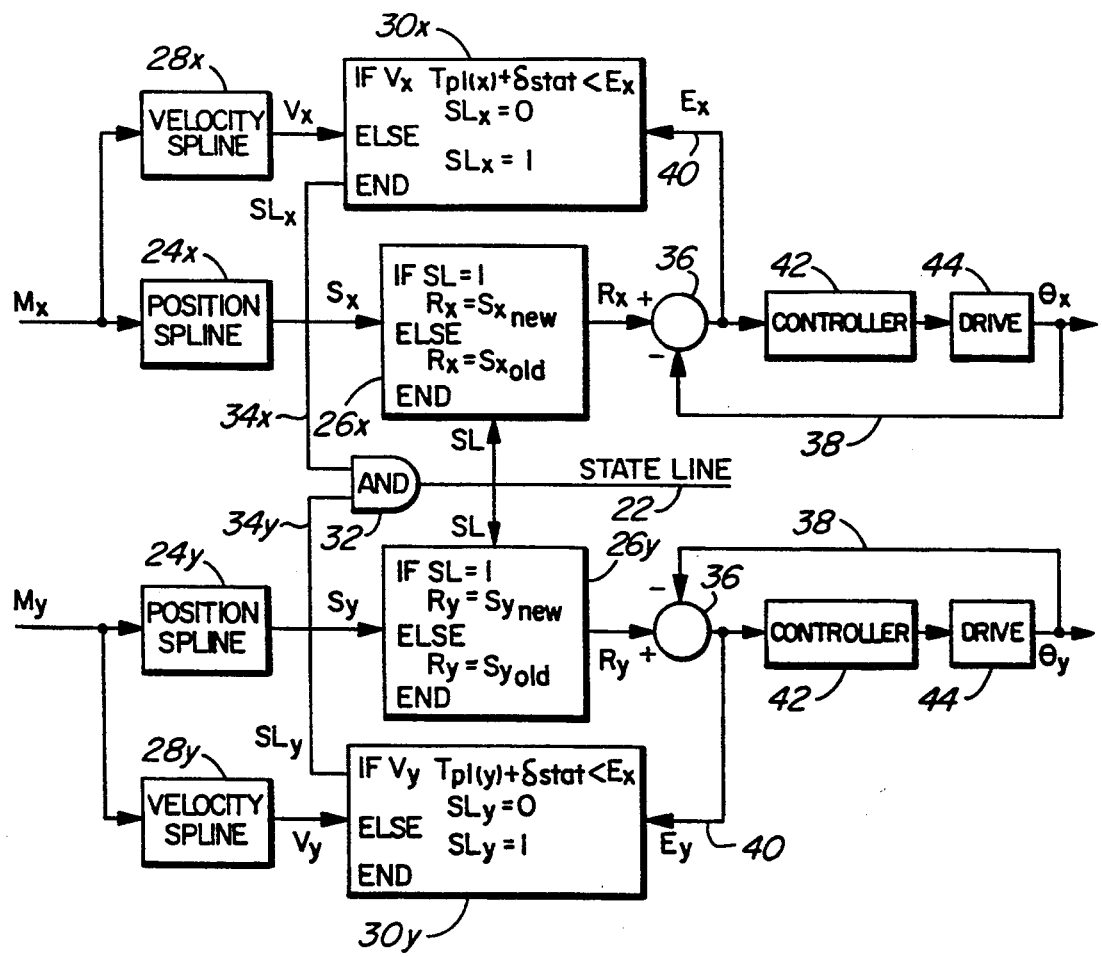
FIG. 2 is a schematic illustration of a two axes controller incorporating the present invention.

FIG. 2 shows a two axes, i.e. an x and y axis control system for generating a status signal to state line 22 to provide a status signal to the system to up-grade the commanded action to the next action or to repeat the last commanded action. In the illustrated system, the two axes have been designated as a x and a y axis and thus, the symbols having the $_x$ refer to the $_x$ axis and same symbols with the y are designating the same element for the y axis.

The master position increments for the x and y axes are introduced as indicated at m and these signals are splined to allow interpolation in the position splining system 24 and operated in the conventional manner to define the increments at the next stage of the operation depending on the state line condition controlled as indicated symbolically by the control station 26. As indicated, if state line signal (status signal) received in the processor, in the illustrated version, is a "1" as opposed to a "0" the reference position R is changed to be equal to the next position increment of the spline $S_{new}$ ($R = S_{new}$), or if the state line status signal SL is 0, R will remain the same, i.e. it will be equal to the previous last position $S_{old}$ ($R = S_{old}$) which is essentially the manner in which the system of U. S. Pat. No. 5,222,017 operates.

With the present invention, the master signal m is subject to a second splining operation as indicated by the velocity splining system 28 wherein the velocity is splined (as will be described in more detail below). As indicated by the error calculation system 30, the allowable error $e_{allowable}$ is calculated based on the velocity v for that particular spline increment plus a preselected constant selected based on the system as will be described herein below and is compared with the actual position error E and used to send a signal to the AND gate 32 as indicated by line 34 (i.e. $vT_{p1} + \delta$ as will be described below). If the calculated allowable error $e_{allowable}$ is greater than the actual error E, the signal delivered by line 34 to the AND gate 32 is a 1. However, if the allowable error $e_{allowable}$ is equal to or less than the actual error E measured, then the status signal generated will be 0 which is delivered by line 34 to the AND gate 32. The output of the AND gate 32 biases the state line 22 to provide the required status signal and thus controls the operations in the station 26 to upgrade R or remain with the old increment.

The operation carried out in the system 26 to move to the desired position (new or same) is compared with the actual position as determined by measurement and delivered to the comparing system 36 via line 38 generating the position error E which is carried via line 40 to the system 30.

The current desired position demanded is delivered to the controller 42 which in turn actuates the drive 44 for the actuation of the commanded change in movement by the actuator.

Figure 3:
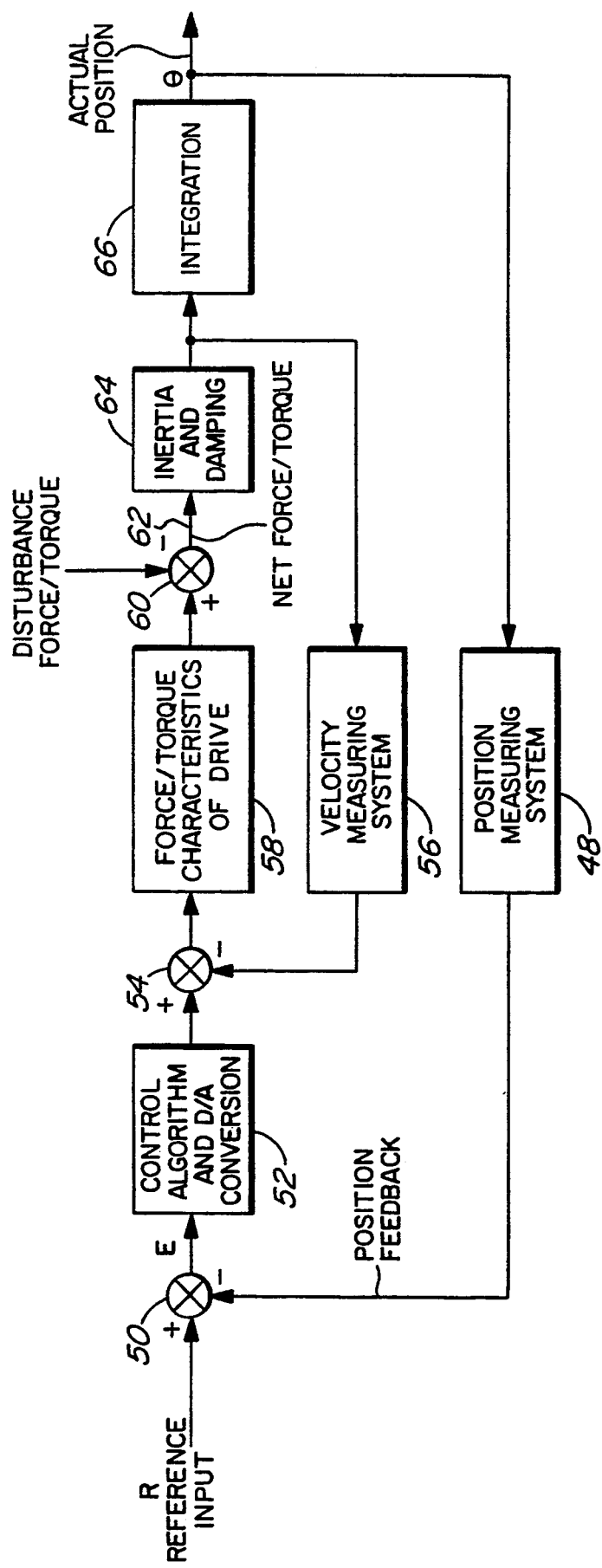
FIG. 3 is a continuous position loop block diagram of the position control loop.

A typical, general block diagram of a single axis of motion is shown in FIG. 3. The actual position of the end effector or tool being positioned, $\theta$, determined by the position measuring system 48 and the difference between the actual and desired or reference position R is determined at 50 to provide the error signal E. The signal from the control algorithm 52 is compared at 54 with the velocity as determined by the velocity measuring system 56 and subjected to modification based on the force torque characteristics of the drive as indicated at 58 and adjusted in accordance with the disturbances forces or torques as indicated at 60 to provide the net force or torque as indicated at 62. The inertial and damping factors are applied as indicated at 64 and integrated as indicated at 66 to achieve the position $\theta$ of end effector.

If the control action is a simple proportional action the system is a type (1) system, however more complex control actions will permit the system to be increased beyond type (1), however, the system is not applicable to a type (0) system.

A more detailed review of the relationship between system type (sometimes referred to as system order number), and steady state errors may be found in a number of texts on Control Engineering, specific attention is directed to Design of Control Systems, A. Frank D'Souza, Prentice-Hall, pp 230-238, 1988.

The allowable error $e_{allowable}$ preferably will be determined based on the following equation $$|e_{allowable}| = |vT_{p1}| = |\delta_{stat}| \tag{1}$$

where $T_{p1}$ is the steady state phase lag
v is velocity
$\delta_{stat}$ is the allowable static error.

In the case of a type (1) system it is conventional to select the phase lag $T_{p1}$ in equation (1) to correspond to the steady state error that occurs in practise when a ramp input of position is encountered. The value of $\delta_{stat}$ depends on the required accuracy of the system and the maximum transient accelerations which are to be accommodated. In the case of a type (2) or higher system the steady state error to a ramp is zero, thus $T_{p1}$ may also be zero, or take a small value. The selection of $\delta_{stat}$ follows the same logic for the higher types as used for type (1) systems.

Figure 4:
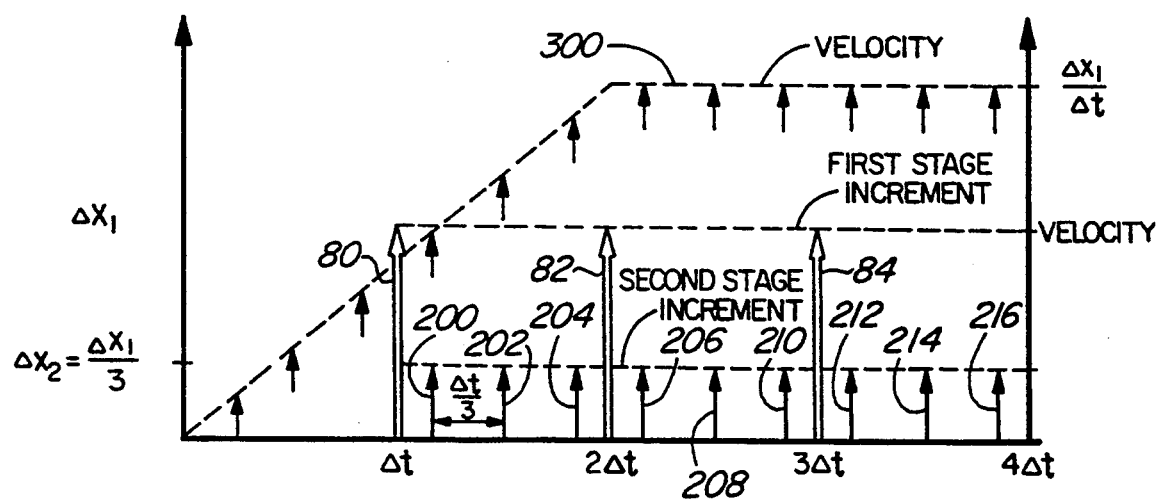
FIG. 4 shows a typical velocity spline based on averaging the velocity increments based on the first stage coarse position increments from the master.

The mode for splining both position and velocity is illustrated schematically in FIG. 4. The first ramp input 80 is applied as indicated at time $\Delta t$ and as is apparent the method follows U.S. Pat. No. 5,222,017 referred to above in that master inputs (first (coarse) series of time spaced increments) 80, 82, 84, etc. are calculated in the first stage and passed to each of the slaves where the second series (fine) of time spaced increments 200, 202, 204 are calculated thereby splining the first stage coarse increments. In the version illustrated in FIG. 4 each first stage or series (coarse) increment is divided into three second stage or series fine increments 200, 202, 204; 206, 208, 210; and 212, 214, 216 respectively. The total distance travelled in the three second stage fine increment, in the illustration, is equal to the distance travelled in the single corresponding first stage coarse increment 80, 82 or 84, but one is free to shape the distribution of motion between the three second stage increments. In the illustration the three second stage increments have all been made equal amplitude, however more complex arrangements are used in practise as described in Yellowley, I. and Pottier, P. R. "A Note on a Simple Method for the Improvement of Interpolation Accuracy in General Purpose, Multi-processor based Motion Controller" International Journal of Machine Tools and manufacture, Vol 29, Number 2, pp 287-292, 1989. The time between each of the coarse increments 80 and 82, 82 and 84 will normally be the same similarly the time $\Delta t$ between each of the increments in the second series will normally be the same and some fraction of the time between increment of the first or coarse series.

The position spline preferably will be of the second order form described in Yellowley and Pottier referred to above, however any low order spline which passes through a series of points along the path may be adequate.

FIG. 4 also indicates the velocity curve or spline 300 derived from the course or first series increment 200, 202, 204, 206, etc. which defines the planned velocity values v used to define $e_{allowable}$.

Normally both the velocity and position relationships will be defined as low order splines and it is preferred that the velocity spline be defined by a simple linear relationship shown by the following equation:

$$v(t) = \frac{1}{2\Delta t}\left[(X_{i+1} - X_{i-1}) + (X_{i+2} - X_{i+1} - X_i + X_{i-1})\frac{t}{\Delta t}\right] \tag{2}$$

where $X_i$ = instantaneous master positions along said position spline
t = time value
$\Delta t$ = increment of time between master (coarse) increments and is illustrated by curve 300.

The time value t normally will be between zero (0) and $\Delta t$, but in the special case where only the coarse set of increments is used the time value t is equal to 0.

The velocities will not lead to the same velocities as those which would arise from differentiation of the position spline i.e. the velocity spline is not necessarily the derivative of the position spline.

To prevent slowing down of the system too much during transients the regular error criteria may be improved in some circumstances (non zero velocity v) and it is therefore preferred to express $e_{allowable}$ in the following form $$\text{sign}(v)e_{allowable} < \text{sign}(v)T_{p1}v + \delta_{static} \tag{3}$$

where $e_{allowable}$ = allowable error
v = current velocity (based on velocity spline)
$T_{p1}$ = steady state phase lag
$vT_{p1}$ = calculated allowable error based on v and $T_{p1}$

EXAMPLE

Figure 5:
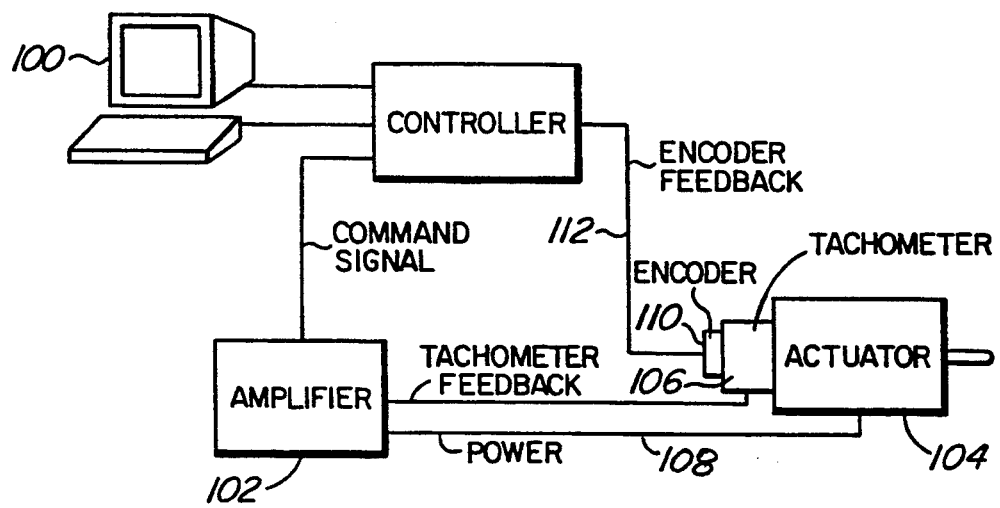
FIG. 5 is a schematic illustration of a control system for a single actuator used to test the present invention.

The present invention was tested using an apparatus as illustrated in FIG. 5, wherein the controller comprises a controller 100 that generates the signals fed to the amplifier 102 and actuator 104. The actuator 104 in the particular embodiment tested was a motor which was provided with a tachometer 106 that provides tachometer feedback signals to the amplifier 102 as indicated by line 108 and with an encoder 110 that feeds an encoder feedback signal or position signal to the controller 100 via line 112. Using the basic system shown in FIG. 5, corner tracking was examined using a variety of different control systems. The results obtained are plotted in FIGS. 6 and at double the speed in FIG. 7 by plotting basic length units (BLU) for each of the displacement angles. The BLU for this specific example was $\pi/2000$ radians.

Figure 6:
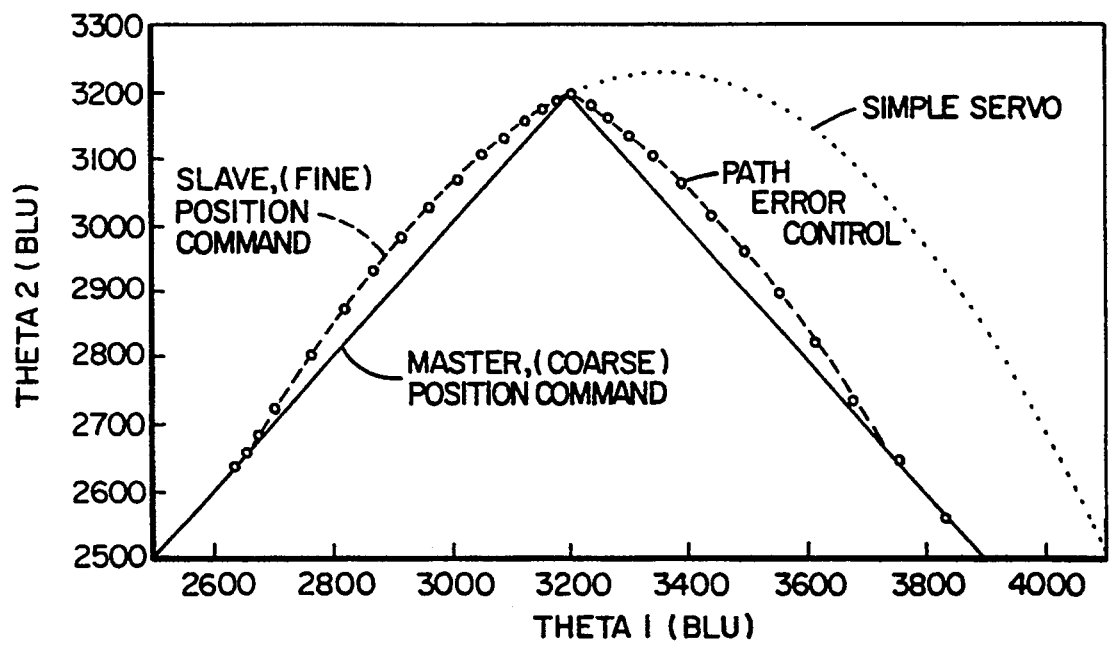
FIG. 6 shows an enlargement of corner tracking using a two axes at a selected rate of rotation (speeds) for two different control systems one with and one without error tracking control enabled.
Figure 7:
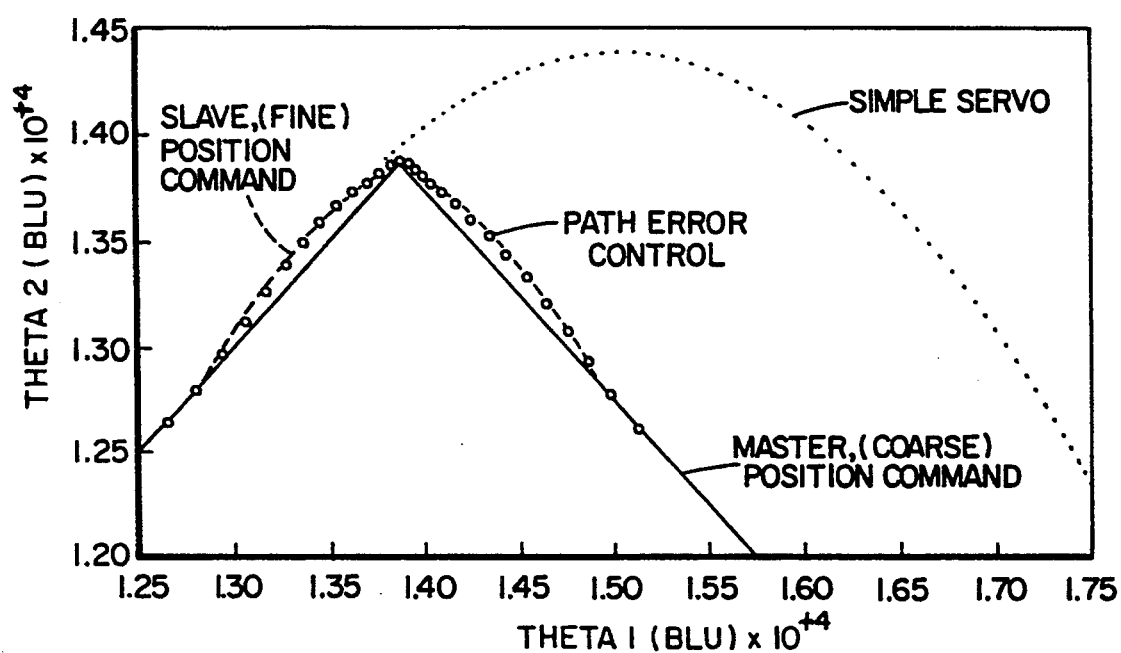
FIG. 7 is a plot similar to FIG. 6 but showing operation at double the speed.

It can be seen from FIGS. 6 and 7 that the present invention utilizing the velocity path error correction technique as indicated by the circles follows most accurately the fine position increments as illustrated by the dash lines and more closely follows to the master spline or desired contour (solid line) both at 500 (FIG. 6) and 1,000 rpm (FIG. 7) than was possible using original technique which followed the dotted line.

Having described the invention, modifications will be evident to those skilled in the art without departing from the scope of the invention as defined in the appended claims.

We claim:

1. An axis interpolation and control system comprising, dividing a desired path of an axis into a series of time spaced position increments, defining a series of planned values v of velocity for said axis over time by interpolation of said position increments, determining the actual position of said axis along said path, comparing said determined actual position with a then current position increment of said desired path to define an actual position error E, determining an allowable error $e_{allowable}$ as a function of a then current planned velocity value v and planned steady state phase lag $T_{p1}$, comparing said position error E with said allowable error $e_{allowable}$ and triggering a status signal to prevent upgrading said control system to the next time spaced position increment in said series when said position error E is larger than said allowable error $e_{allowable}$.

2. An axis control system as defined in claim 1 wherein said allowable $e_{allowable}$ will be determined based on the following equation $$|e_{allowable}| = |vT_{p1}| + |\delta_{stat}| \quad (1)$$

where
$T_{p1}$ is the steady state phase lag
v is velocity
$\delta_{stat}$ is the allowable static error.

3. An axis control system as defined in claim 2 wherein said velocity spline defined by the linear relationship $$v(t) = \frac{1}{2\Delta t}\left[(X_{i+1} - X_{i-1}) + (X_{i+2} - X_{i+1} - X_i + X_{i-1})\frac{t}{\Delta t}\right] \quad (2)$$

where
$X_i$ = instantaneous position increment of said first series
t = time value
$\Delta t$ = an increment of time.

4. An axis control system as defined in claim 3 wherein said dividing said desired path into a series of time spaced increments will comprise dividing said path into a first coarse time spaced series of position increments and defining a second series of fine time spaced position increments by interpolation of said coarse position increments and wherein said series of planned values v of velocity are defined by interpolation of said increments of said first series of increments and wherein said actual position error E is determined by comparing said determined actual position with a then current increment of said second series of fine time spaced increments and said status signal prevents upgrading said control system to the next said time spaced position increment in said second series when said position error E is larger than said allowable error $e_{allowable}$.

5. An axis control system as defined in claim 2 wherein said allowable error $e_{allowable}$ for non zero velocity v is defined by $$\text{sign}(v)e_{allowable} < \text{sign}(v)T_{p1}v + \delta_{static} \quad (3)$$

where
$e_{allowable}$ = allowable error
v = current velocity v
$T_{p1}$ = steady state phase lag
$vT_{p1}$ = calculated allowable error based on v and $T_{p1}$.

6. An axis control system as defined in claim 5 wherein said dividing said desired path into a series of time spaced increments will comprise dividing said path into a first coarse time spaced series of position increments and defining a second series of fine time spaced position increments by interpolation of said coarse position increments and wherein said series of planned values v of velocity are defined by interpolation of said increments of said first series of increments and wherein said actual position error E is determined by comparing said determined actual position with a then current increment of said second series of fine time spaced increments and said status signal prevents upgrading said control system to the next said time spaced position increment in said second series when said position error E is larger than said allowable error $e_{allowable}$.

7. An axis control system as defined in claim 2 wherein said dividing said desired path into a series of time spaced increments will comprise dividing said path into a first coarse time spaced series of position increments and defining a second series of fine time spaced position increments by interpolation of said coarse position increments and wherein said series of planned values v of velocity are defined by interpolation of said increments of said first series of increments and wherein said actual position error E is determined by comparing said determined actual position with a then current increment of said second series of fine time spaced increments and said status signal prevents upgrading said control system to the next said time spaced position increment in said second series when said position error E is larger than said allowable error $e_{allowable}$.

8. An axis control system as defined in claim 1 wherein said planned velocity v is defined by the linear relationship $$v(t) = \frac{1}{2\Delta t}\left[(X_{i+1} - X_{i-1}) + (X_{i+2} - X_{i+1} - X_i + X_{i-1})\frac{t}{\Delta t}\right] \quad (2)$$

where
$X_i$ = instantaneous position increment of said first series
t = time value
$\Delta t$ = an increment of time.

9. An axis control system as defined in claim 8 wherein said dividing said desired path into a series of time spaced increments will comprise dividing said path into a first coarse time spaced series of position increments and defining a second series of fine time spaced position increments by interpolation of said coarse position increments and wherein said series of planned values v of velocity are defined by interpolation of said increments of said first series of increments and wherein said actual position error E is determined by comparing said determined actual position with a then current increment of said second series of fine time spaced increments and said status signal prevents upgrading said control system to the next said time spaced position increment in said second series when said position error E is larger than said allowable error $e_{allowable}$.

10. An axis control system as defined in claim 1 wherein said allowable error $e_{allowable}$ for non zero velocity v is defined by $$\text{sign}(v)e_{allowable} < \text{sign}(v)T_{p1}v + \delta_{static} \quad (3)$$

where $e_{allowable}$ = allowable error
$v$ = current velocity v
$T_{p1}$ = steady state phase lag
$vT_{p1}$ = calculated allowable error based on v and $T_{p1}$.

11. An axis control system as defined in claim 10 wherein said dividing said desired path into series of time spaced increments will comprise dividing said path into a first coarse time spaced series of position increments and defining a second series of fine time spaced position increments by interpolation of said coarse position increments and wherein said series of planned values v of velocity are defined by interpolation of said increments of said first series of increments and wherein said actual position error E is determined by comparing said determined actual position with a then current increment of said second series of fine time spaced increments and said status signal prevents upgrading said control system to the next said time spaced position increment in said second series when said position error E is larger than said allowable error $e_{allowable}$.

12. An axis control system as defined in claim 1 wherein said dividing said desired path into a series of time spaced increments will comprise dividing said path into a first coarse time spaced series of position increments and defining a second series of fine time spaced position increments by interpolation of said coarse position increments and wherein said series of planned values v of velocity are defined by interpolation of said increments of said first series of increments and wherein said actual position error E is determined by comparing said determined actual position with a then current increment of said second series of fine time spaced increments and said status signal prevents upgrading said control system to the next said time and said status signal prevents upgrading said control system to the next said time spaced position increment in said second series when said position error E is larger than said allowable error $e_{allowable}$.

* * * * *